Dec. 9, 1941. W. H. PHELPS 2,265,545
LAWN MOWER
Filed Aug. 16, 1940 2 Sheets-Sheet 1

Inventor
W. H. Phelps
By Hiram A. Sturgess Attorney

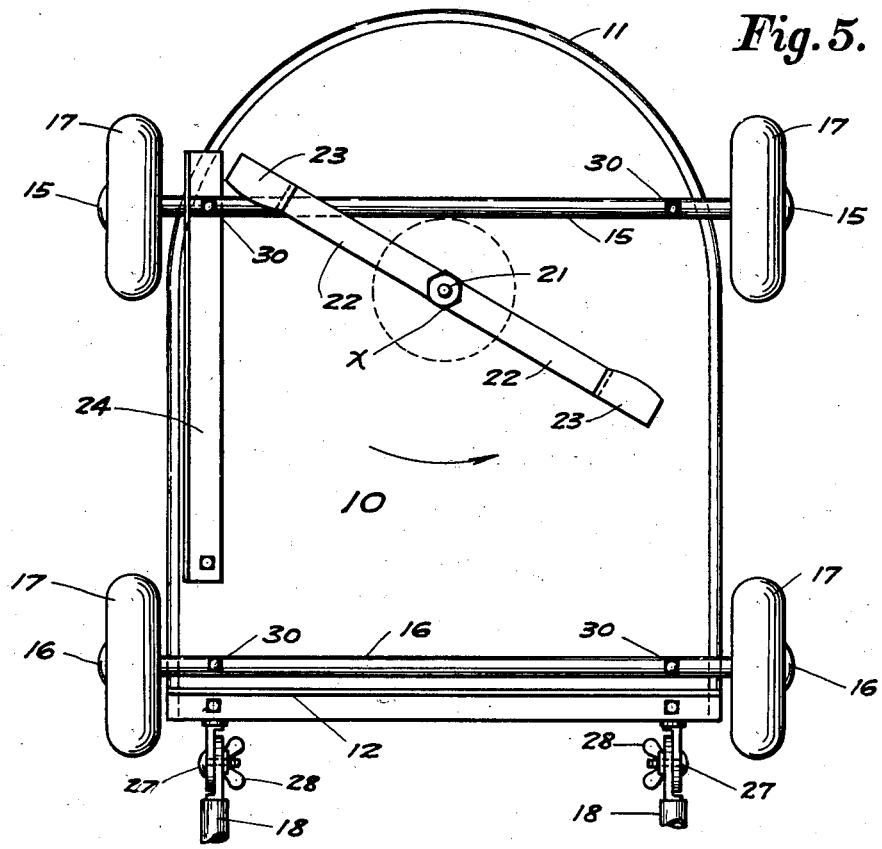
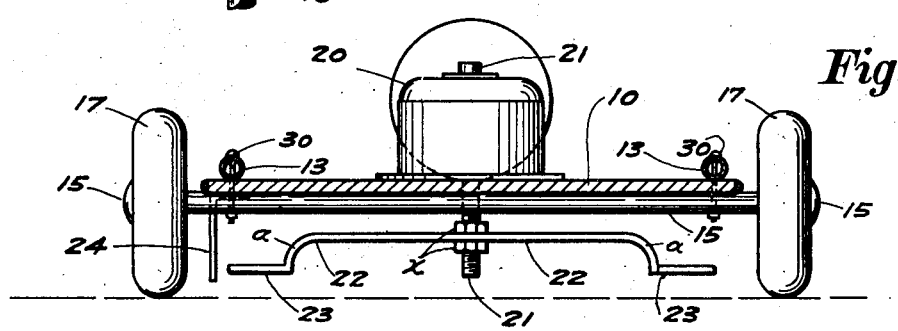
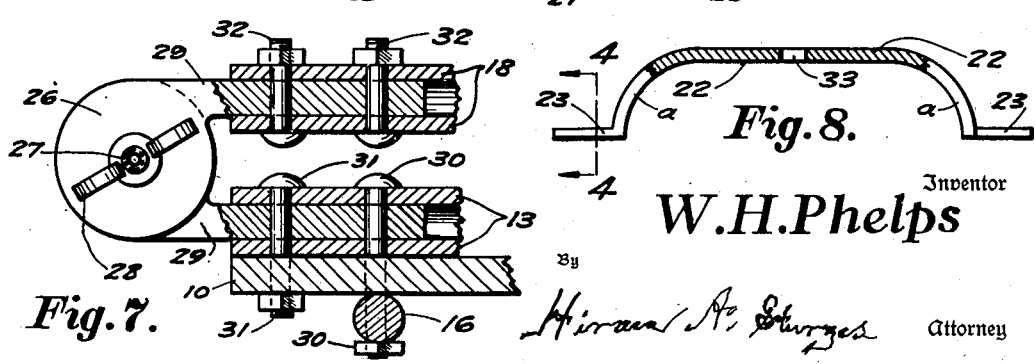

Patented Dec. 9, 1941

2,265,545

UNITED STATES PATENT OFFICE 2,265,545

LAWN MOWER

William H. Phelps, Louisville, Nebr.

Application August 16, 1940, Serial No. 352,907

4 Claims. (Cl. 56—25.4)

This invention relates to an improvement in lawn mowers, and particularly to that class of hand-operated mowers adapted to cut tall grass and weeds at the front of the mower-body by horizontal cutter blades carried by a central, vertical, rotatable shaft.

The objects in view relate, in part, to such a construction that a swath of greater width than ordinary may be cut with a lesser expenditure of power.

One of the objects has been to provide a control of the movements, during operation, of the severed grass, so that clogging thereof with the ground wheels may be prevented.

The invention includes adjustable means of such arrangement that grass may be cut closely or at selected distances from the ground.

One of the objects has been to provide means for adjusting the inclination of the handles of the mower so that its movements may be under convenient control during operation.

It has been an object to provide a lawn mower consisting of few parts so that convenience in use and durability may be attained, said parts being detachable, for the most part, so that shipments from the factory will be practical. Other objects in view will appear hereinafter.

The invention consists of the new and useful construction, combination and arrangement of parts as described herein and claimed, and as illustrated in the drawings, it being understood that changes may be made in form, size, proportions and minor details, said changes being within the scope of the invention as claimed.

In the accompanying drawings, Fig. 1 is a top plan view of the lawn mower, the handle being broken away. Fig. 2 is a view of the same in longitudinal section on line 2—2 of Fig. 1, a handle being added.

Fig. 5 is a bottom plan view of the mower body, the handles being broken away. Fig. 6 is a view in transverse section on line 6—6 of Fig. 1.

Fig. 7 is a sectional detail showing the arrangement of parts for coupling the handle with the mower frame. Fig. 8 is a view of an arcuate cutter-bar partly in section.

Figure 1:
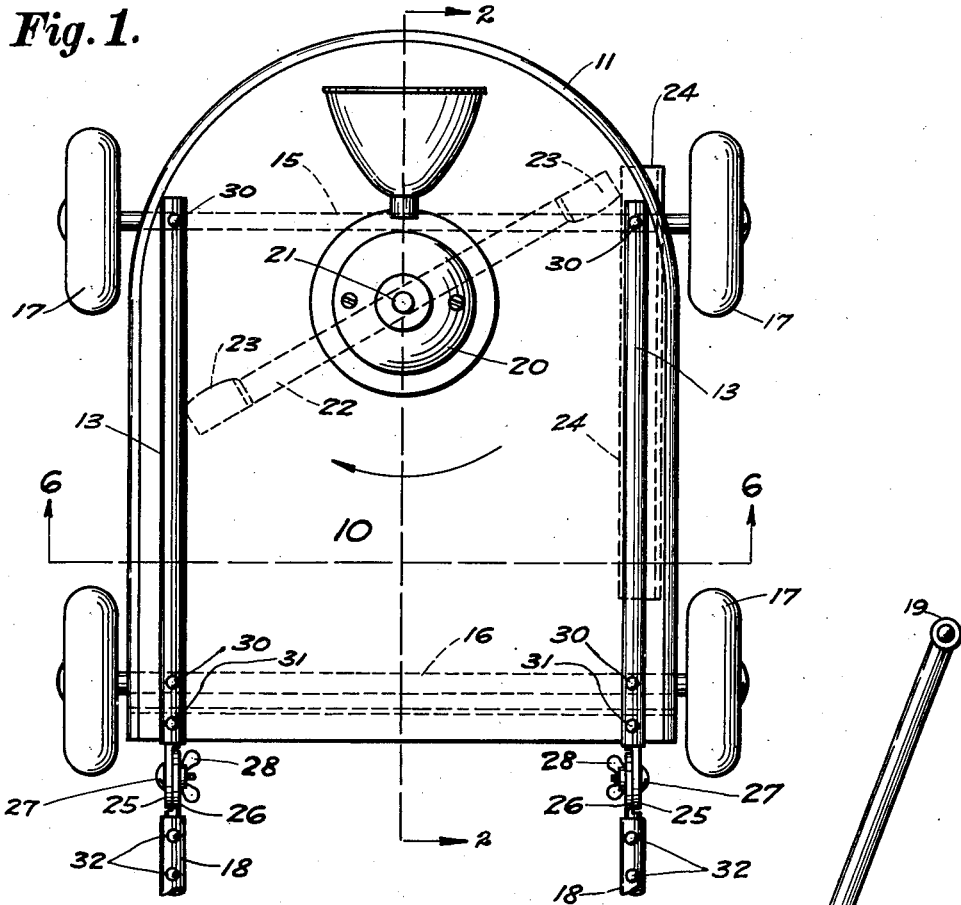
Figure 2:
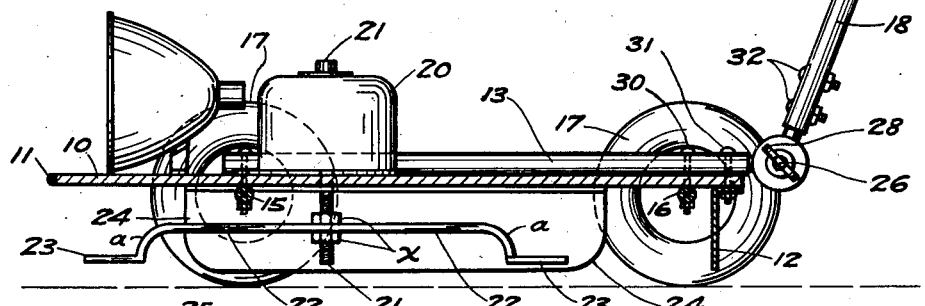

Referring now to the drawings for a particular description, the flat body of the mower consists of a horizontal, attenuated plate or platform 10 approximately rectangular in plan, having a front end of semicircular form provided with a buffer-strip 11 of resilient material, the rear end of said plate being provided, transversely, with a downwardly projecting safety-plate 12.

In order to reinforce the attenuated plate 10 so that shocks and vibrations will be adequately resisted, a rectangular frame is provided consisting, in part, of a pair of stabilizing members 13 secured to the upper side of the platform 10 by keepers 30.

The front axle 15 and rear axle 16 below the platform, may be considered parts of the rectangular, stabilizing frame since they are also secured to the platform 10 by said bolts 30.

Numerals 17 indicate ground wheels which are disposed at the sides of the platform and journalled on the axles.

In operation, the mower may be moved manually by use of a handle-member consisting of a pair of parallel handle-bars 18 which are connected to each other at their outer ends by a cross-bar 19, the inner ends of members 18 being movably mounted on the stabilizing-members 13 in a manner presently to be described.

Numeral 20 indicates a motor which is secured to the platform for rotating a vertical operating-shaft 21 which is suitably threaded at its lower end for mountings thereon of a pair of lock-nuts as indicated at x, and between these lock-nuts may be rigidly secured the arcuate cutter-bar 22 for the horizontal blades 23 at the terminals of the downwardly projecting arms a thereof.

Numeral 24 indicates a control-plate which is secured to the "off" side of the platform, said plate being disposed at the inner side of a front ground-wheel and extending to the inner side of the rear ground-wheel, the width of said plate being sufficient to prevent a movement of the "swath" or severed grass, thrown in that direction by the blades 23, from clogging said wheels or hindering a forward movement of the mower.

The parts 18 and 19 of the handle and parts 13 for the rectangular mower-frame are preferably of tubular construction. Numerals 25 and 26 indicate coupling-discs arranged in pairs, the discs of each pair being pivotally connected by a bolt 27 to permit rotation of each disc 26 relative to a disc 25, each threaded bolt 27 being provided with a wing-nut 28. Each disc is provided with an arm 29 projecting from its periphery, the arm 29 of each disc 25 being disposed in the end of a tubular frame-member 13 and secured therein by bolts 30 and 31 and the arm 29 of each disc 26 extending into the end-portion of a handle-bar 18 and secured therein by bolts 32, the bolts 30 preferably extending through the platform and axles in the formation of the rectangular mower-frame above mentioned.

As thus described the handle may be readily adjusted to be disposed at any required inclination for convenient operation, and by use of the wing-nuts 28 the discs may be pressed against each other firmly for preventing any swinging movements of the handle relative to the mower body. Also it will be noted that the handle may be swung forwardly a half circle and may lie in locked condition upon the top of members 13 for occupying a limited space when crated or otherwise when making shipments from the factory, the wing-nuts 28 operating to maintain the handle in position above and parallel with said platform.

It will be appreciated that the use of the adjusting-nuts $x$ is a very convenient, effective and inexpensive means for disposing and maintaining the blades 23 at selected distances from the ground, the bar, midway between its ends, being provided with an aperture 33 for receiving the rotatable shaft; and in operation, the bar is pressed between these members $x$ in such a degree that it will move with the shaft without undue vibration.

Figures 3, 4:
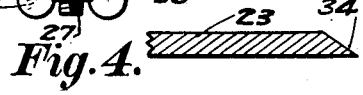
Fig. 3 is a broken detail, showing a coupling for the handles on the mower frame.
Fig. 4 is a view of a blade in transverse section on line 4—4 of Fig. 8.

During operation, the grass will be drawn inwardly of the mower body by action of suction, and this is of advantage. However, the degree of suction depends upon the shape of the blades 23 in cross-section. In the present instance, and as shown in Fig. 4 of the drawings, each blade is formed with a flat bottom, and preferably is of rectangular form in cross-section except the inclined facet 34 at its cutting edge, and since this facet is of limited width and of limited inclination the degree of suction will be adequate and effective to cause the suction mentioned.

The advantages derived in the form of the cutter-bar 22 will be appreciated by users of the herein described mower for the reason that no contact or lodgement of severed grass or weeds on the bar or any part thereof will occur, said bar, on account of its arcuate form offering no resistance except the resistance directed to the horizontal blades.

I claim as my invention,

1. In a lawn mower, a platform having parallel sides and a semicircular front end provided with a resilient buffer-member, a rotatable vertical shaft concentric with the semicircular part of the platform and provided below the platform with horizontally movable cutter-blades, a pair of stabilizing-bars on the platform each provided with a coupling-disc, engaging-means for securing the stabilizing-bars and platform to the axles, a pair of connected handle-members each having a coupling-disc disposed in register and secured to a coupling-disc of a stabilizing-bar, and a downwardly projecting buffer-plate secured to a side of the platform adjacent a front ground-wheel and having a part disposed in a plane below the cutter-blades of said shaft.

2. In a lawn mower, a pair of axles provided with ground-wheels, a flat platform on the axles provided with a semicircular front end-portion and having parallel sides, a pair of stabilizing bars on the platform at the sides thereof, keepers traversing the axles, platform and stabilizing bars for connecting them as a unit, an elastic buffer-member covering the semicircular end-portion of the platform, a vertical, rotatable operating shaft concentric with the semicircular end-portion of the platform, and cutter-blades below the platform movable with the operating-shaft.

3. In a lawn mower, a pair of parallel axles provided with ground-wheels, a flat platform having parallel side edges and semicircular end-portion and disposed on the axles, a pair of stabilizing-bars disposed upon the platform at the side edges thereof, means traversing and tending to secure the axles, platform and stabilizing-bars as a unit, a vertically disposed, rotatable operating-shaft concentric with the semicircular part of the platform, cutter-blades below the platform movable with the operating shaft, and a control-plate disposed in the vertical plane of a stabilizing-bar, closely adjacent a pair of ground-wheels and extending to a horizontal plane below said cutter-blades.

4. In a lawn mower, a pair of axles provided with ground-wheels, a flat platform having parallel sides, a front end of semicircular form and disposed on the axles, a pair of stabilizing-bars disposed at and parallel with the sides of the platform, means traversing and securing the axles, platform and stabilizing-bars together as a unit, a vertical, rotatable operating-shaft journalled centrally of the semicircular end of the platform and provided with blades, a control-plate extending downwardly from the platform closely adjacent a pair of ground-wheels, a safety-plate disposed rearwardly of the cutter-blades transversely and secured to the platform, and a pair of connected handle-bars disposed parallel with the stabilizing-bars pivotally mounted upon and adapted to be moved into parallelism to lie upon said stabilizing-bars.

WILLIAM H. PHELPS.